United States Patent [19]

Gallegos

[11] Patent Number: 4,866,465
[45] Date of Patent: Sep. 12, 1989

[54] SHADOW ELIMINATING MOUNTING BRACKET FOR A CAMERA AND FLASH UNIT

[76] Inventor: John C. Gallegos, P.O. Box 3, Las Vegas, N. Mex. 87701

[21] Appl. No.: 194,153

[22] Filed: May 16, 1988

[51] Int. Cl.$^4$ ............................................. G03B 15/02
[52] U.S. Cl. ................................... 354/126; 354/295; 354/293
[58] Field of Search ................... 354/81, 126, 145.1, 354/293, 295

[56] References Cited

U.S. PATENT DOCUMENTS

| | | | |
|---|---|---|---|
| 2,483,711 | 10/1949 | Roos | 354/293 |
| 3,187,170 | 6/1965 | Kille | 240/145.1 X |
| 3,550,519 | 12/1970 | Lewis | 354/293 |
| 4,072,970 | 2/1978 | Winkler | 354/187 |
| 4,166,680 | 9/1979 | Maitami | 354/126 |
| 4,231,645 | 11/1980 | Davis et al. | 354/145.1 |
| 4,255,036 | 3/1981 | Pincetich | 354/293 |
| 4,350,420 | 9/1982 | Engelsmann et al. | 354/145.1 |

Primary Examiner—L. T. Hix
Assistant Examiner—Brian W. Brown
Attorney, Agent, or Firm—Marcus L. Bates

[57] ABSTRACT

Apparatus for achieving shadowless pictures, comprising a unitary mounting bracket for supporting a camera and a flash unit in spaced relationship respective to one another. The flash unit is optimumly positioned above and rearwardly of the camera lens at a distance which avoids "red eye" and at the same time eliminates shadows. The flash unit can be moved circumferentially 90° about the camera lens to enable the flash unit to be properly positioned for the camera to be used in either the vertical or horizontal format.

8 Claims, 1 Drawing Sheet

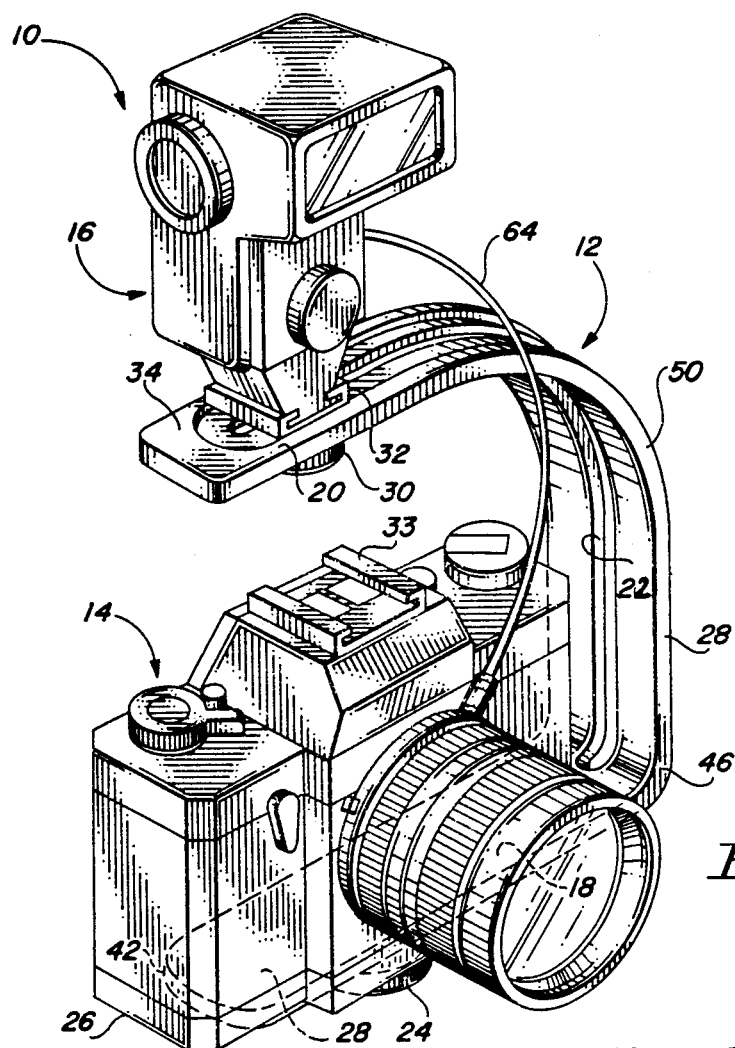
FIG-1
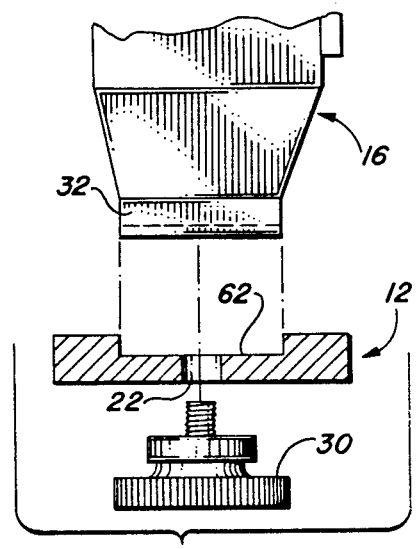
FIG-4
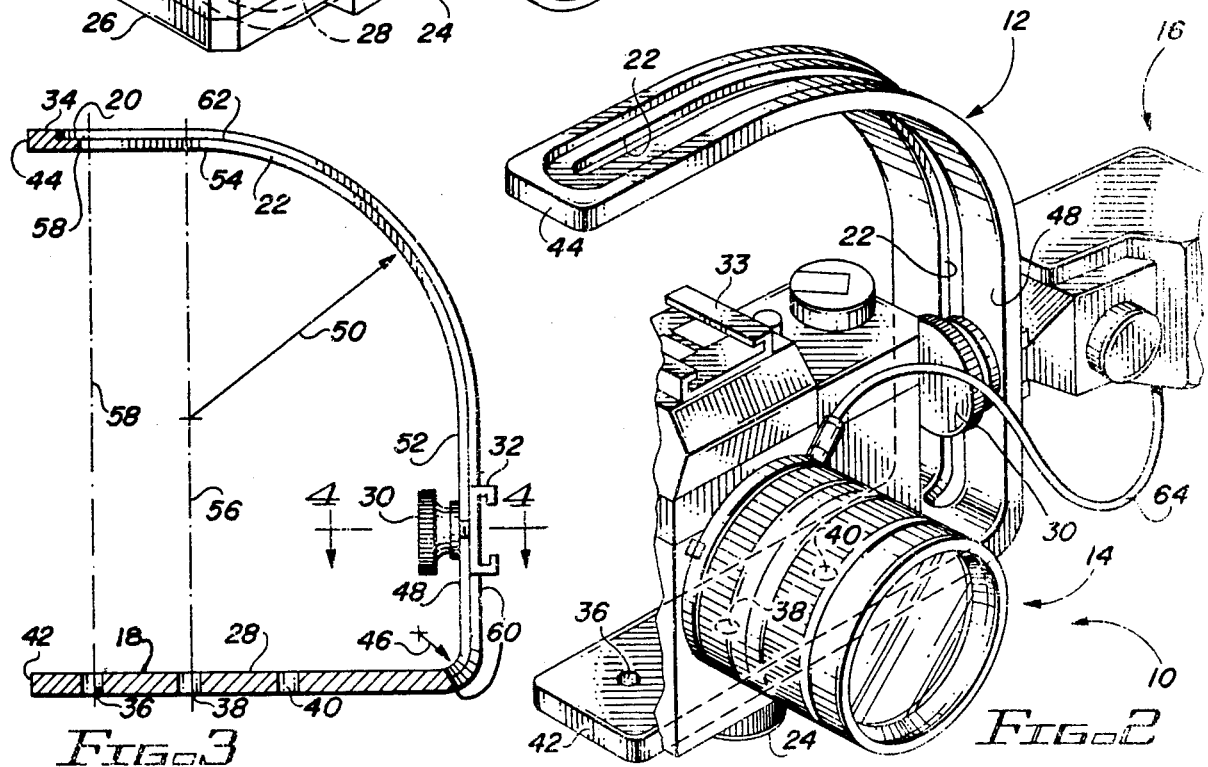
FIG-3
FIG-2

SHADOW ELIMINATING MOUNTING BRACKET FOR A CAMERA AND FLASH UNIT

BACKGROUND OF THE DISCLOSURE

In the art if photography, the lighting of a scene is probably more important than the selection of the appropriate aperture and shutter speed. The scene must be lighted properly in order for the picture to reproduce the subject. Lighting by flash near and above the camera can illuminate heavy shadows facing the camera; however, lighting too near the camera lens can result in "red eye". It would therefore be desirable to have made available a mount for receiving a camera and a flash unit in properly spaced relationship thereon, with the flash unit being spaced above and behind the camera lens an amount that illuminates heavy shadows facing the camera. It would be desirable that the flash unit be easily moved circumferentially respective to the camera lens 90° so that the camera can be selectively used in either the vertical or the horizontal format. A mount which achieves these desirable attributes is the subject of the present invention.

SUMMARY OF THE INVENTION

A camera and flash unit are supported on a bracket in spaced relationship to one another, with the flash unit being positioned directly above and behind the camera lens when the camera is used in either the vertical or horizontal format. Means are provided for the flash unit to be moved 90° about the camera lens so that when the camera is rotated 90° in order to change the format, the flash unit can be moved to a position vertically above the camera lens. This relationship positions the flash unit above the camera lens and thereby throws or casts the shadows behind the subject to thereby eliminate undesirable shadows from the subject.

The bracket of this invention has a first mounting surface for receiving a camera thereon. A flash unit is supported at either a second or a third mounting surface which are spaced from one another and from the first mounting surface. The second mounting surface is arranged perpendicular to the first and third mounting surface, while the first and third mounting surfaces are parallel to one another.

More specifically, this invention provides a track means which extends from the second to the third mounting surface. An accessory shoe is mounted for movement along the track means and can therefore be moved between the second and the third mounting surfaces. The flash unit is received in mounted relationship by the accessory shoe. The track means can be an elongated slot which receives a bolt therethrough by which the accessory shoe is movably mounted in a slidable manner respective to the track means.

The bracket can be made from a unitary, elongated piece of metal or plastic which has a rectangular cross-section, and which is bent into a configuration to provide the above mounting bracket. This is achieved by placing a sharp 90° bend between the first and second mounting surfaces, and a large 90° bend between the second and third mounting surfaces, so that the third mounting surface is superimposed over the first mounting surface.

A primary object of the present invention is the provision of means for optimumly positioning a flash unit respective to a camera, when the camera is used in either the horizontal or vertical format, to cast the shadow behind the subject.

Another object of this invention is the provision of a combination comprised of a camera, flash unit, and mount therefor by which the camera and flash unit are positioned respective to one another so that the flash unit always sits above and behind the lens and positioned whereby shadows are eliminated from a picture taken with the combination.

An additional object of this invention is the provision of a shadowless picture taking apparatus comprised of a mount which receives a camera and flash unit thereon in a manner to optimumly space the camera lens from the flash unit and thereby cast shadows behind the subject.

These and various other objects and advantages of the invention will become readily apparent to those skilled in the art upon reading the following detailed description and claims and by referring to the accompanying drawings.

The above objects are attained in accordance with the present invention by the provision of a combination of elements which are fabricated in a manner substantially as described herein.

BRIEF DESCRIPTION OF THE DRAWINGS

FIG. 1 is a front, perspective view showing the combination of the present invention;

FIG. 2 is a broken, front, perspective view showing the present invention in an alternate operative configuration;

FIG. 3 is a longitudinal, cross-sectional view of part of the apparatus disclosed in FIGS. 1 and 2; and, FIG. 4 is an exploded, part cross-sectional view taken along line 4—4 of FIG. 3.

DETAILED DESCRIPTION OF THE PREFERRED EMBODIMENT

In the figures of the drawings, and in particular FIGS. 1 and 2, there is disclosed a combination of elements 10 made in accordance with the present invention, which includes a unitary mounting bracket 12, a camera 14, and a flash unit 16. The camera 14 and flash unit 16 belong to the prior art and are commercially available. The camer 14 preferably is a 35 mm camera such as "Top Con" or "Pentax". The flash unit 16 is an electronic flash unit having a bulb which is triggered by a low voltage circuit generating a high voltage pulse. The flash unit bulb can be used many times. Of the many different flash units 16 available, it is preferred to use a Vivitar 285.

As seen in FIG. 3, the novel unitary mounting bracket 12 is made in accordance with this invention and has one marginal end 18 which provides a flat, horizontally arranged camera receiving base. The other marginal end 20 of the mounting bracket 12 is also a flat, horizontal surface which forms a horizontal mount for the flash unit 16. The marginal ends 18 and 20 are therefore parallel to one another so that the flash unit is vertically positioned above the camera lens. A circumferentially extending slot 22 extends between the marginal ends 18 and 20.

A king bolt 24, in the form of the usual knurled camera knob, releasably attaches the base 26 of camera 14 to the marginal end 18 of the mount 12. Numeral 28 indicates the flat camera receiving surface formed on the inside of the marginal end 18 of the frame against which the flat bottom 26 of camera 14 is received.

Another king bolt 30, in the form of a knurled flash unit knob, attaches the flash unit mounting shoe 32 to the exterior surface of the mounting bracket 12. The king bolt 30 is received through the slot 22. The mounting shoe 32 is similar to the mounting shoe 33 found on the camera 14. Numeral 34 indicates the flat marginal end formed on the exterior of the other end 20 of the mounting bracket 12.

A sharp bend having a small radius 46 forms a 90° angle between the vertical leg 48 and the flat horizontal marginal end 18. Numeral 50 indicates a large radius 90° bend commencing in the general area indicated by numeral 52 and merging with the flat part 20 at the general area indicated by numeral 54.

Numeral 56 indicates a vertical plane passing through aperture 38 and slot 22, along which the flash unit and camera lens will be aligned on most 35 mm cameras when the camera is in the horizontal format seen in FIG. 1. Numeral 58 indicates a plane passing through the outermost aperture 36 and one end of the slot 22. Numeral 60 indicates the other end of the slot 22. The slot 22 is formed centrally of a coextending groove 62 which is formed in the outer surface of the unitary mount 12.

Conductor 64 interconnects the flash unit with the camera. The flash is triggered by the usual low voltage circuit which generates a high voltage pulse. The flash is synchronized with the shutter action of the camera. The conductor 64 forms part of the triggering circuit fired by the switch in the shutter apparatus of the camera 14.

As seen in FIG. 3, numeral 32 indicates a camera accessory show that the flash unit clips onto for mounting purposes. King bolt 30 is threadedly received by the accessory shoe 32. When the king bolt 30 is loosened, the bolt and shoe can be slidably moved longitudinally along the track formed by slot 22 and groove 62 from one extremity 58 to the other extremity 60 of the slot 22. This curved distance is 90° change in direction. The camera 14 can be centered in either of the apertures 36-40. Most 35 mm cameras, such as the Top Con and Pentax, will be properly aligned when they are fastened at aperture 38 by means of king bolt 24. Other cameras may need to be fastened at aperture 36 or 40.

In operation, the combination of the present invention will usually be in the configuration set forth in FIG. 1 of the drawings. In this configuration, the king bolt mounts the camera by means of aperture 38 while the flash unit 16 is visually aligned along plane 56 so that the lamp of the flash unit is directly above and behind the camera lens and in vertical alignment therewith.

In the preferred embodiment, the distance between mounting surfaces 20 and 28 is 7-½ inches. This places the lens of the camera 14 more than 10 inches away from the light emitting lens of the flash 16. The camera lens is positioned slightly forward of the flash unit light output.

When it is desired to photograph objects with the camera in the vertical format, the king bolt 30 is loosened and the flash unit 16 moved circumferentially about the camera lens into the horizontal position of FIG. 2, and then the entire apparatus is rotated into the vertical position for obtaining vertical format pictures. This again positions the flash unit light output above and to the rear of the camera lens.

Accordingly, the slot 22 and groove 62 cooperate with king bolt 30 and accessory shoe 32 to provide a track mounted flash unit which can be moved circumferentially about the camera lens from the position seen in FIG. 1 into the position seen in FIG. 2, and vice versa. This provides shadowless pictures because the flash unit light output is propagated from location respective to the camera lens which illuminates heavy shadows facing the camera. This location of the camera and flash unit avoids direct illumination of the camera lens which would result in "red eye". Accordingly, the present invention governs the lighting of a scene in a way to reproduce the subject and eliminate shadows. At any time desired, the flash unit can be moved respective to the camera so that pictures can be taken in the vertical or the horizontal format with the flash unit always emitting light from a location above the camera lens. This unique arrangement of the camera lens and flash unit eliminates shadows by throwing or casting the shadows behind the subject. Hence, the flash unit is adjustably positioned above the camera lens to thereby throw or cast shadows behind the subject.

I claim:

1. A mounting bracket having a first mounting surface for receiving a camera spaced from a second and third mounting surface for receiving a flash unit; said second mounting surface is perpendicular respective to said first and third mounting surfaces; said first and third mounting surfaces are parallel to one another; track means formed between said second and third mounting surfaces; means for moving a flash unit along said track means from said second to said third mounting surface;

whereby; said flash unit can be moved along said track into a location above the camera lens when the camera is in either the horizontal or vertical format, and thereby cast shadows behind a subject.

2. The bracket of claim 1 wherein said track means has 90° curvature between said second and third mounting surfaces.

3. The bracket of claim 1 wherein said bracket is of unitary design and is a relatively flat elongated member having a relative sharp 90° bend between said first and second mounting surfaces and a relative large 90° bend between said second and third mounting surfaces.

4. The bracket of claim 3 wherein said track means is an elongated slot formed centrally within said member;
   a king bolt received through the slot, an accessory show slidably received on said member and engaged by said bolt.

5. The bracket of claim 4 wherein said track means has 90° curvature between said second and third mounting surfaces, so that the flash unit is always positioned above the camera lens and thereby eliminates undesirable shadows from the subject.

6. Photographic apparatus for lighting from a location spaced above a camera when the camera is in either the horizontal or the vertical format comprising in combination:
   a bracket, a camera, a flash unit; means connecting said flash unit to be triggered when said camera is actuated;
   said bracket has a marginal end upon which said camera is removably mounted;
   said bracket includes another marginal end upon which said flash unit is removably mounted; said another marginal end is parallel to and spaced above the first said marginal end;
   said bracket includes a medial length upon which said flash unit is removably mounted; said medial length is perpendicular respective to the first said marginal end and said another marginal end; said medial length and said another marginal end are connected together by a track means which has 90° curvature between said medial length and said another marginal end, said flash unit is mounted for movement respective to said track means and can be moved along the length thereof; whereby, said flash unit can selectively be positioned at either of said another marginal end and said medial length to thereby enable the camera and flash unit to be used in either the vertical or horizontal format.

7. The combination of claim 6 wherein said bracket is of unitary design and is made from a relatively flat elongated member having a relative sharp 90° bend between said marginal end and said medial length; and, a relative large 90° bend between said medial length and said another marginal end.

8. Photographic apparatus for lighting from a location spaced above a camera when the camera is in either the horizontal or the vertical format comprising in combination:

a bracket, a camera, a flash unit; means connecting said flash unit to be triggered when said camera is actuated;

said bracket has a marginal end upon which said camera is removably mounted;

said bracket includes another marginal end upon which said flash unit is removably mounted; said another marginal end is parallel to and spaced above the first said marginal end;

said bracket includes a medial length upon which said flash unit is removably mounted; said medial length is perpendicular respective to the first said marginal end and said another marginal end; and means by which said flash unit can selectively be positioned at either of said another marginal ends and said medial length to thereby enable the camera and flash unit to be used in either the vertical or horizontal format;

said bracket is of unitary design and is made from a relatively flat elongated member having a relative small bend between said marginal end and said medial length; and, a relative large bend between said medial length and said another marginal end;

a slot is formed in said member that extends from said another marginal end to said medial length; said slot forms a track and is located centrally within said member;

a king bolt received through the slot; and, an accessory show slidably received on said member and engaged by said king bolt.

* * * * *